United States Patent [19]
Bergt

[11] 3,929,989
[45] Dec. 30, 1975

[54] STABLE SUSPENSION OF CALCIUM-MAGNESIUM OXYTETRACYCLINE FOR INTRAUTERINE ADMINISTRATION IN TREATMENT OF BOVINE METRITIS

[75] Inventor: Gregory P. Bergt, Belle Plaine, Minn.

[73] Assignee: Wendt Laboratories, Inc., Belle Plaine, Minn.

[22] Filed: June 14, 1974

[21] Appl. No.: 479,430

[52] U.S. Cl. .............................................. 424/227
[51] Int. Cl.² ........................................ A61K 31/65
[58] Field of Search ...................................... 424/227

[56] References Cited
UNITED STATES PATENTS
3,557,280  1/1971  Weber et al. ..................... 424/227

*Primary Examiner*—Sam Rosen
*Attorney, Agent, or Firm*—Williamson, Bains & Moore

[57] ABSTRACT

A therapeutic composition for intrauterine infusion in bovine species in the treatment of metritis is comprised of a suspension of calcium-magnesium oxytetracycline having a molar ratio of combined calcium and magnesium to oxtetracycline of about 4 to 1.

3 Claims, No Drawings

ST ABLE SUSPENSION OF CALCIUM-MAGNESIUM OXYTETRACYCLINE FOR INTRAUTERINE ADMINISTRATION IN TREATMENT OF BOVINE METRITIS

FIELD OF THE INVENTION

This invention relates to a stable suspension of calcium-magnesium oxytetracycline which is particularly effective in treating bovine metritis.

BACKGROUND OF THE INVENTION

Oxytetracycline hydrochloride is commonly used in uterine treatment in cows. Typically in the treatment of bovine metritis, a predetermined dosage (usually 4 mg/kg body weight) of a solution of oxytetracycline hydrochloride is applied by intrauterine administration to an infected cow. Although cows treated with solutions of oxytetracycline hydrochloride produce satisfactory blood levels of suitable duration, unfortunately, oxytetracycline often appears in the milk of treated lactating cows. Milk obtained from cows treated for metritis and containing oxytetracycline cannot be distributed for human consumption. In large dairy operations, substantial financial losses can be incurred, if the milk of lactating cows cannot be used.

Theoretical and experimental evidence seems to indicate that drugs, such as oxytetracycline, seem to pass across the uterine membrane of the cows, via passive (non-ionic) diffusion. It was thought that complexed oxytetracycline, i.e., oxytetracycline chelated with metal ions would not be as likely to pass across the uterine membrane than non-chelated oxytetracycline.

Therefore, oxytetracycline chelated with metal ions was tested and compared to non-chelated oxytetracycline for the purpose of determining the distribution of the oxytetracycline in the plasma, milk and urine, following intrauterine administration. Although the investigation indicated that both the chelated and non-chelated form of oxytetracycline entered the milk plasma and urine, it was shown that the non-chelated form entered the milk in significant quantities. Further investigation indicated that no oxytetracycline appeared in the milk where chelated suspensions of oxytetracycline were used, and specifically, suspensions of calcium-magnesium oxytetracycline having a molar ratio of combined calcium and magnesium to oxytetracycline of at least 4 1. It is felt that the molar ratio of the combined magnesium and calcium metal ions to oxytetracycline is very critial as to the likelihood of occurence of oxytetracycline in the milk of those animals treated for metritis.

SUMMARY OF THE INVENTION

It is an object of this invention to provide a stable therapeutic suspension of calcium-magnesium oxytetracycline having a molar ratio of calcium and magnesium to oxytetracycline of about 4 to 1, this suspension being the novel calcium-magnesium oxytetracycline suspension, which is applied by intrauterine infusion is especially effective in treating lactating cows suffering from metritis, since there is little, if any, danger of oxytetracycline appearing in the milk of the treated animals.

DESCRIPTION OF THE PREFERRED EMBODIMENT OF THE INVENTION

In accordance with the preferred method of preparing the novel suspenion, oxytetracycline hydrochloride is dissolved in an aqueous polypropylene glycol suspension containing calcium and magnesium salts. Sufficient amounts of the calcium and magnesium salts are provided so that the final product has a molar ratio of calcium and magnesium to oxytetracycline of about 4 to 1. The reactions are preferably carried out at room temperature (22°–29°C).

The pH of the suspension is important, and it is preferred that the suspension have a slightly alkaline condition, although neutral to alkaline conditions are acceptable. In this respect, the pH range of 5.0 to 11.0 is acceptable, although it is preferred that the novel suspension have the pH of about 9.3 to 9.7.

The following example is a further illustration of the invention:

EXAMPLE

| Material | gm/liter |
| --- | --- |
| Oxytetracycline Hydrochloride (Expressed as Base) | 50 mg |
| 1, 2 — Propanediol | 787 mg |
| Formaldehyde Sodium Sulfoxylate | 10 mg |
| Magnesium Chloride Hexahydrate | 35 mg |
| Calcium Chloride Anhydrous | 44 mg |
| 2 — Aminoethanol | 45 mg |
| Distilled Water | 160 mg |
| | 1131 mg |

In this example, the molar ratio is of calcium-magnesium to oxytetracycline is 4.32 to 1. Although it has been found that suspensions having a molar ratio of calcium-magnesium to oxytetracycline may be greater than 4.32 to 1, it has been determined that oxytetracycline will pass across the uterine membrane when the molar ratio is less than 4 to 1. It will be appreciated that when oxytetracycline is chelated or complexed with excessive amounts of magnesium and calcium salts, the resulting suspension will become increasingly thick and accordingly less effective when administered by intrauterine infusion. Therefore, suspension having a molar ratio of calcium-magnesium to oxytetracycline of about 8 to 1 are acceptable although suspensions in which the molar ratio of calcium-magnesium to only tetracycline are greater than 8 to 1 are not as effective. It will be appreciated that the aqueous solvent of 1,2 propanediol contains about 17 percent water.

PROCEDURE

It is preferred that the procedure used to produce the novel suspension be carried out in situ in a batch operation using two mixing tanks.

1. Add the 1,2 propanediol to the first mixing tank;
2. Add approximately one-half of the distilled water to the second mixing tank and dissolve the magnesium chloride and calcium chloride, anhydrous, in the distilled water in the second mixing tank by agitation;
3. Transfer the aqueous solution containing magnesium chloride and calcium chloride from the second tank to the first tank containing the 1,2 propanediol and agitate rapidly;
4. Add the remaining distilled water to the second tank and dissolve the sodium sulfoxylate formaldehyde therein by rapid agitation;

5. Transfer the sodium sulfoxylate formaldehyde solution to the first tank and agitate rapidly. The first tank now contains propylene glycol, magnesium chloride, calcium chloride, sodium sulfoxylate formaldehyde and distilled water mixed into a uniform solution.
6. Add 80% of the required ethanolamine to the first tank and agitate rapidly;
7. Add the oxytetracycline hydrochloride to the first tank and agitate for approximately three hours. Check the pH of the suspension and adjust by adding additional ethanolamine to that the pH falls within the range of 9.3 to 9.7. Thereafter, continue mixing for an additional 30 minutes and then package in appropriate containers.

Six lactating cows were tested with the novel suspension of calcium-magnesium oxytetracycline to determine the distribution of the drug in the plasma and milk, the drug being applied by intra-uterine infusion. Blood and milk samples were collected at 0.5, 1, 2, 4, 6, 8, 12, 24, 48, 72, 96 and 120 hours after treatment. The calcium-magnesium oxytetracycline was given at doses of 4 mg/kg body weight respectively, and the tests indicated that oxytetracyline activity in the plasma appeared in 2 to 4 hours and remained until the 23 hour collection, with peak activity appearing at 4 hours. Oxytetracycline did not appear in the milk of any of the six cows studied. Based on the tests, it appears as though the milk from cows treated with oxytetracycline compounds which do not have a molar ratio of calcium and magnesium into oxytetracycline of 4 to 1, should be withheld for 24 hours while the milk from animals receiving calcium-magnesium oxytetracycline suspension (molar ratio of calcium and magnesium to oxytetracycline of about 4 to 1) comprising the present invention would have no withholding time.

What is claimed is:

1. A therapeutic composition for intrauterine infusion in bovine species for treating metritis, which comprises:
   a stable suspension of calcium-magnesium oxytetracycline and having a molar ratio of combined calcium and magnesium to oxytetracycline of about 4–4.3 to 1,
   in an aqueous solvent of 1,2 propanediol containing about 17 percent water, at a pH substantially between 5.0 and 11.

2. The composition as defined in claim 1 wherein said molar ratio of combined calcium and magnesium to oxytetracycline is about 4 to 1.

3. The composition as defined in claim 1 wherein the pH of said composition is within the range of 9.3 to 9.7.

* * * * *